United States Patent [19]

Berneiser

[11] Patent Number: 4,478,113

[45] Date of Patent: Oct. 23, 1984

[54] TOOL FOR AIDING IN THREAD CONNECTING A SPARK PLUG OR OTHER OBJECT IN PLACE

[76] Inventor: Herwig M. Berneiser, 7521 Peppertree Dr., Stockton, Calif. 95207

[21] Appl. No.: 373,888

[22] Filed: May 3, 1982

[51] Int. Cl.[3] .............................................. B23B 13/52

[52] U.S. Cl. .................................... 81/64; 81/3.38 R; 81/455

[58] Field of Search ....................... 81/64, 3.38 R, 453, 81/455

[56] References Cited

U.S. PATENT DOCUMENTS

| | | | |
|---|---|---|---|
| 2,743,640 | 5/1956 | Verkuil | 81/64 |
| 3,379,231 | 4/1968 | Gallo | 81/455 |
| 3,397,602 | 8/1968 | Estep et al. | 81/64 |

*Primary Examiner*—Frederick R. Schmidt
*Assistant Examiner*—J. T. Zatarga
*Attorney, Agent, or Firm*—Flehr, Hohbach, Test, Albritton & Herbert

[57] ABSTRACT

A device is disclosed herein for aiding in properly connecting the threaded segment of one object, for example a spark plug, to a complementary threaded segment of a second object, for example an engine block including a complementary threaded hole. This device is designed so as to be capable of applying sufficient torque to the first object to loosely connect its threaded segment to the threaded segment of the second object in a properly threaded fashion. On the other hand, the device is designed so as not to be able to apply sufficient torque to the first object to connect together the threaded segments in a way which would strip or otherwise damage the threads. In this way, once the two objects are loosely connected together in a properly threaded fashion, a second device, for example a standard socket wrench, can be utilized for tightening the two objects without fear of damaging their threads.

3 Claims, 3 Drawing Figures

TOOL FOR AIDING IN THREAD CONNECTING A SPARK PLUG OR OTHER OBJECT IN PLACE

The present invention relates generally to tools for connecting the threaded segment of one object, for example a spark plug, to a complementary threaded segment of a second object, for example the engine block of an automobile having complementary threaded opening, and more particularly to a specifically design device for aiding in making this connection without fear of stipping or otherwise damaging the threads forming part of either objects.

It is common practice to use a standard socket wrench for installing spark plugs in a car. This usually requires an extension including means located at the free end of the extension for holding a given spark plug before the latter is initially threaded into its cooperating opening in the engine block. The spark plug is held by the wrench itself where the threaded opening in the engine block is not sufficiently accessible to allow an individual to initially loosely thread connect it into the opening directly by hand, which is generally the case.

A major drawback in using a standard socket wrench and extension or like tool for installing a spark plug into an inaccessible opening is that the spark plug may be inadvertently cross-threaded or otherwise improperly threaded in place, thereby stripping or otherwise damaging the threads. This is especially true when there is limited, if any, visual access to the threaded opening by the individual handling the wrench. The rigidity of the socket wrench prevents the installer from being able to "feel" whether or not the spark plug is properly threaded and the lack of visual accessibility makes it difficult to properly align it with its opening in the first place. As a result, even if the spark plug is not properly threaded initially, the installer will most likely not know this and attempt to thread it tightly into place using the wrench, thereby damaging the threads.

In view of the foregoing, it is an object of the present invention to provide a tool or device especially suitable for aiding in the installation of a spark plug, specifically one which eliminates the possibility of stripping or otherwise damaging the threads forming part of the spark plug or the opening into which the spark plug is installed.

Another object of the present invention is to provide the device just recited in an uncomplicated, reliable and yet economical manner.

A more particular object of the present invention is to provide a tool or device of the last-mentioned type which is capable of applying sufficient torque to the spark plug for properly thread connecting it in place in a loose or at most "finger tight" fashion while, at the same time, being incapable of applying sufficient torque to the spark plug to install it in a way which would strip or otherwise damage its threads.

Another particular object of the present invention is to provide a tool or device of the last-mentioned type capable of thread connecting other objects together in the same way, that is, in a loose or at best finger tight fashion while, at the same time, insuring that the threads forming part of these objects are not stripped or otherwise damaged.

As will be seen in more detail hereinafter, the device disclosed herein is one which is utilized for aiding in properly connecting the threaded segment of a first object, for example a spark plug, to a complementary threaded segment of a second object, for example an engine block having a complementary threaded opening. This device comprises first means for disengagably holding the first object such that its threaded segment is exposed and second means capable of applying sufficient torque to the first object to loosely connect its threaded segment to the threaded segment of the second object in a properly threaded fashion, the second means being incapable of applying sufficient torque to the first object to connect together the threaded segments in a way which would strip or otherwise damage the threads of each segment. In this way, the device can be utilized to loosely thread connect the two objects together in a properly threaded fashion without risk of stripping or otherwise damaging the threads. Thereafter, a separate device such as the standard socket wrench recited previously can be utilized to tighten the connection.

These and other objects and features of the present invention will become more apparent hereinafter from the following detailed description in conjunction with the drawings wherein.

Figure 1:
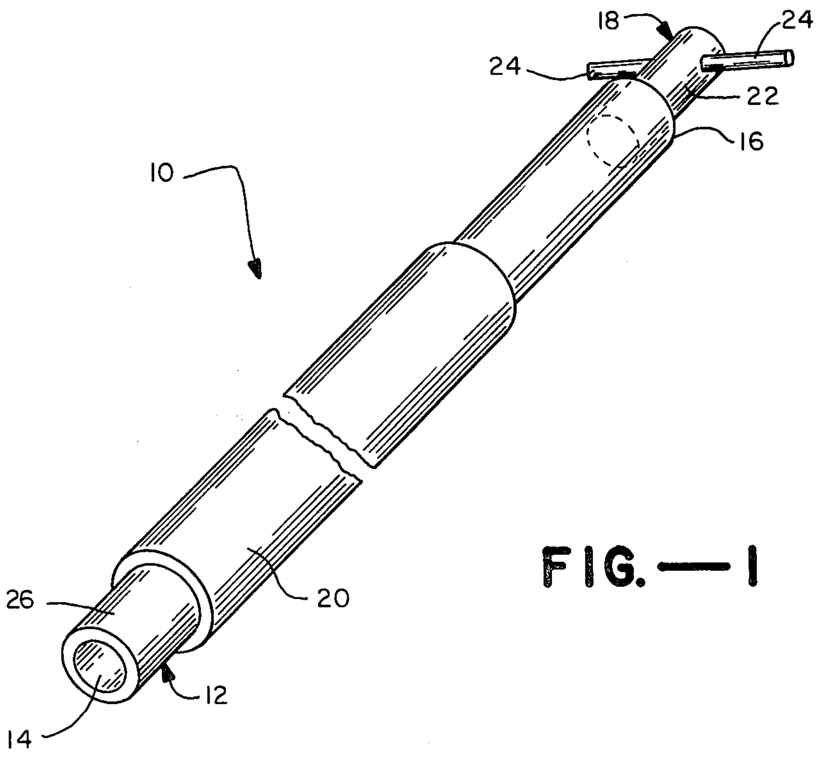
FIG. 1 is a broken perspective view of the device designed in accordance with a preferred embodiment of the present invention.

Turning now to the drawings, wherein like components are designated by like reference numerals throughout the three figures, attention is first directed to FIG. 1. This figure illustrates a device 10 which is designed in accordance with a preferred embodiment of the present invention to aid in properly connecting the threaded end segment of a spark plug into a complementary threaded opening in an engine block, as will be described hereinafter. The device is shown including an elongated, straight tubular member 12 having a front open end 14 and a back open end 16. The tubular member is constructed of any suitable material which makes it sufficiently flexible or resilient to function in the manner to be described hereinafter. In an actual working embodiment, tubular member 12 is constructed of relative hard rubber.

Device 10 also includes a rigid handle 18 and a rigid outer sleeve 20. As seen in FIG. 1, the handle which may be hard plastic or metal includes a main body 22 and cross fingers 24. A portion of the main body is disposed within the back opened end 16 of tubular member 12 in a bonded or friction tight fashion sufficient to prevent the handle from being able to rotate relative to the tubular member. Sleeve 20 which may also be constructed of hard plastic or metal is disposed concentrically around tubular member 12 in a relative close but slidable fashion. The sleeve is shorter in length than tubular member 12 and thus is movable axially along the tubular member between the rearward position illustrated in FIGS. 1 and 2 and the forward position illustrated in FIG. 3. With the sleeve in its rearward position, it lies entirely rearwardly of a forwardmost end section 26 of tubular member 12. When the sleeve is in its forward position, a front portion thereof extends around section 26. As will be seen hereinafter with regard to FIGS. 2 and 3, handle 18 serves to rotate tubular member 12 for initially installing a spark plug 28 in a loose or at best finger tight fashion and sleeve 20 serves to hold the spark plug in place at the end of the tubular member during this procedure.

Figure 2:
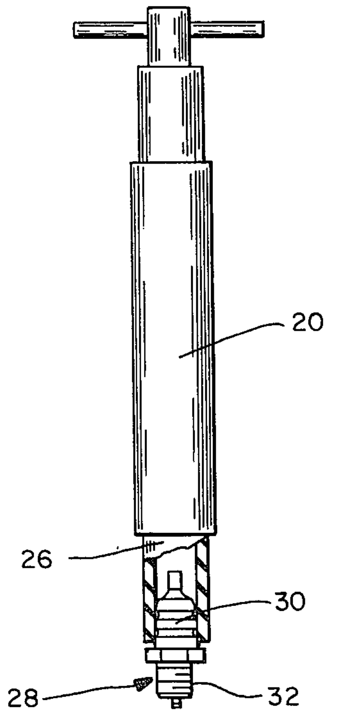
FIG. 2 is a partially broken away side elevational view of the device of FIG. 1, shown loosely holding a spark plug.
Figure 3:
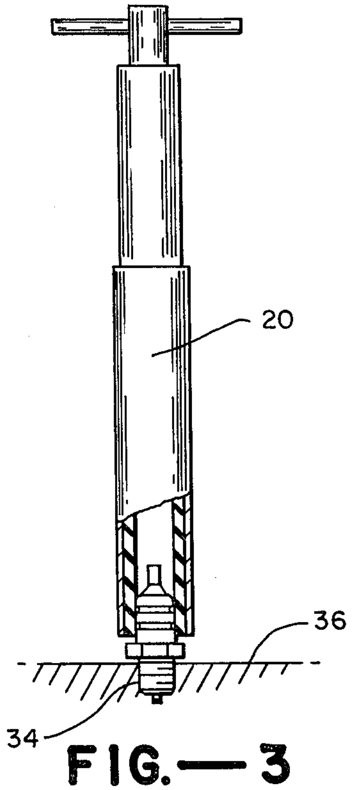
FIG. 3 is a partially broken away side elevational view of the device of FIG. 1, shown tightly engaging the spark plug as the latter is being initially installed in a cooperating threaded opening.

Referring to FIG. 2, the unthreaded body 30 of spark plug 28 is shown disposed within front end section 26 of tubular member 12. In this regard, the maximum cross sectional dimension of body 30 is slightly greater than the inner diameter of tubular section 26 when the latter is in a relaxed state. Thus, spark plug body 30 must be forced fitted into open end 14 and therefore the tubular section 26 must be sufficiently flexible or resilient to accommodate the spark plug body. This is accomplished while sleeve 20 remains in its rearward position. After the spark plug has been force fitted into position, the sleeve is moved (forceably so if necessary) to its forward position over tubular section 26. This causes the tubular section to tightly grip body 30 of the spark plug for reliably holding the latter in place. With spark plug 28 held by device 10 in this manner, its threaded segment 32 is disposed in axial alignment with tubular member 12 directly in front of open end 14.

Device 10 may be utilized to connect threaded segment 32 of spark plug 28 into a cooperating threaded opening 34 in an engine block in a properly threaded fashion without risk of stripping or otherwise damaging the threads forming part of segment 32 or opening 34, even if the opening is not visually accessible. This is possible because of the flexibility or resiliency of tubular member 12. More specifically, the tubular member is sufficiently rigid so that when handle 18 is rotated about the axis of member 12, the latter is able to apply sufficient torque to the spark plug to loosely connect threaded segment 32 into opening 34 in a properly threaded fashion. However, the tubular member is sufficiently flexible or resilient so as to be incapable of applying enough torque to the spark plug to thread connect segment 32 into opening 34 in a cross threaded or otherwise improper way which would strip or otherwise damage the threads of either. In this way, even though the individual installing the spark plug may not be able to see opening 34, he is able to feel when the spark plug is properly threaded. In any event, he cannot inadvertently cross-thread the spark plug into position and strip or otherwise damage the threads using device 10 since the device will not provide sufficient torque to do this. At the same time, it should be apparent that device 10, as described, can only be used to install the spark plug in a loose at most finger tight fashion. However, once segment 32 is loosely threaded into opening 34 in a properly threaded fashion, a standard socket wrench or like tool can be utilized to tighten the spark plug without fear of damaging its threads or the threads forming part of the opening.

Overall device 10 has been described in its embodiment for installing a spark plug. It should be apparent that this device can be utilized for aiding in properly connecting the threaded segment of any object to a complementary threaded segment of a second object, so long as the size and shape of the objects are compatible with the tool. Obviously, device 10 must be capable of holding the first object in the manner described above. In addition, while the particular configuration of device 10 illustrated and described is preferred, it is to be understood that this configuration could vary so long as the device is capable of providing sufficient force to loosely thread the two objects in a properly threaded fashion while being incapable of applying sufficient force to connect the two in a way which would strip or otherwise damage the threads as a result of a cross threading or the like. For example, the overall device could use a member corresponding to tubular member 12 but one which is not entirely resilient or flexible.

What is claimed is:

1. A device for aiding in properly connecting the threaded end segment of a spark plug or similar object into a complementary threaded opening provided by an engine block or like opening when direct visual access is limited and the spark plug or similar object cannot be installed by hand, said device comprising a tubular member including a back end section and flexible front end section having an opened end which is slightly smaller than the unthreaded body of said spark plug or similar object but sufficiently flexible or resilient for forceably receiving said unthreaded body such that its threaded segment extends outwardly therefrom; a rigid tubular sleeve shorter in length than said tubular member positioned concentrically around said member in a close fitting but slidable fashion, said sleeve being slidably movable along said tubular member between a first position entirely rearwardly of the front end section of said tubular member, whereby to allow the unthreaded body of said spark plug or like object to be inserted therein and a second position such that at least a portion of the sleeve is disposed around the front end section of said tubular member, whereby to hold the unthreaded body of said spark plug or like object within the front end segment of said tublar member; and handle connected with the back end section of said tubular member for rotating the latter about its longitudinal axis; said tubular member including an intermediate section which is sufficiently rigid such that the entire tubular member can be rotated at said handle means to loosely connect the threaded segment of said spark plug or like object into said complementary threaded opening in a properly threaded fashion but incapable of applying sufficient torque to the spark plug of like object to place the threaded segment of the latter into said opening in a way which would strip or otherwise damage the threads of either the object or opening.

2. A device according to claim 1 wherein said tubular member is a formed flexible tube along its entire length.

3. A device according to claim 2 wherein said flexible tube is constructed of rubber.

* * * * *